United States Patent [19]

Zajac et al.

[11] 4,130,289

[45] Dec. 19, 1978

[54] WORK HOLDER MECHANISM FOR AUTOMATIC MACHINE TOOL

[75] Inventors: Chester S. Zajac, Parma; Frederick T. Cockram, Lyndhurst; Scott B. Thompson, Westlake, all of Ohio

[73] Assignee: Zamco Manufacturing Co., Valley View, Ohio

[21] Appl. No.: 687,358

[22] Filed: May 17, 1976

[51] Int. Cl.² .................... B23B 5/22; B23B 5/34
[52] U.S. Cl. ........................... 279/1 A; 226/158; 285/421; 403/358
[58] Field of Search ............... 226/149, 151, 158, 162; 214/1.1, 1.2, 1.3, 1.4, 1.5; 403/318, 326, 370, 358, 374, 361, 356, 409; 279/1 A; 285/421

[56] References Cited

U.S. PATENT DOCUMENTS

| 783,762 | 2/1905 | Stahl | 403/358 |
|---|---|---|---|
| 1,885,224 | 11/1932 | Brinkman et al. | 226/149 |
| 2,676,063 | 4/1954 | Whitt | 403/358 X |
| 3,148,902 | 9/1964 | Gardner | 285/421 |
| 3,853,413 | 10/1974 | Parran | 403/326 X |
| 3,910,476 | 10/1975 | Zajac | 226/158 |

Primary Examiner—Othell M. Simpson
Assistant Examiner—C. U. Wer
Attorney, Agent, or Firm—Baldwin, Egan, Walling & Fetzer

[57] ABSTRACT

A work holder including a pusher or feed tube for an automatic machine tool, such as an automatic screw machine, with the work holder including a stock aligning and/or supporting bushing or collar member having a stock receiving opening therethrough with wedge block means coacting with the collar for selectively locking the collar in predetermined rotational position at the stock entry end of the feed tube. The locking arrangement provides for effective and rapid locking and unlocking of the collar to the feed tube, and permits ready changing or replacement of the collar member, thereby providing for rapid interchange for different sizes and/or cross sectional configurations of stock material to be fed into the feed tube.

14 Claims, 6 Drawing Figures

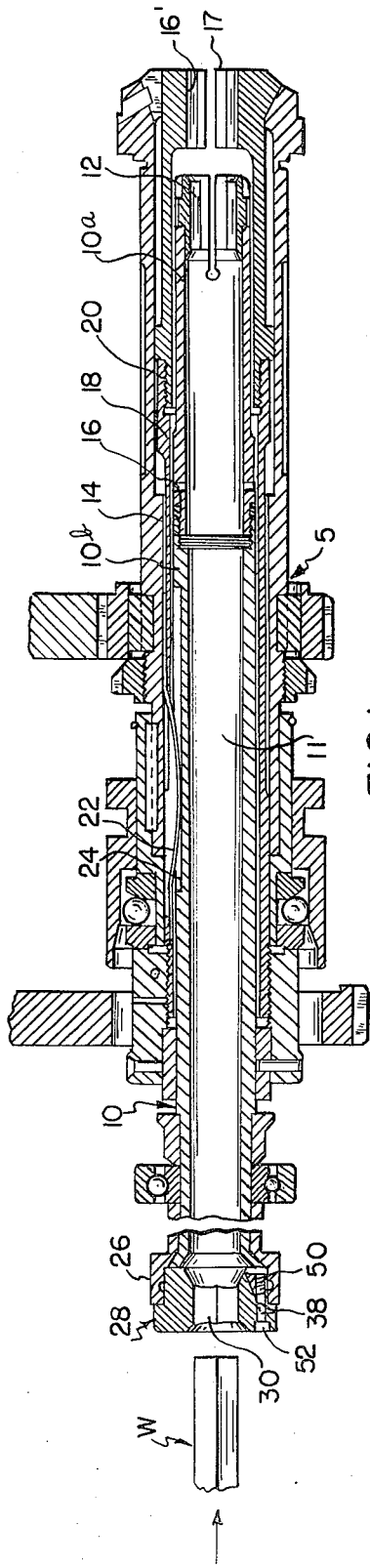
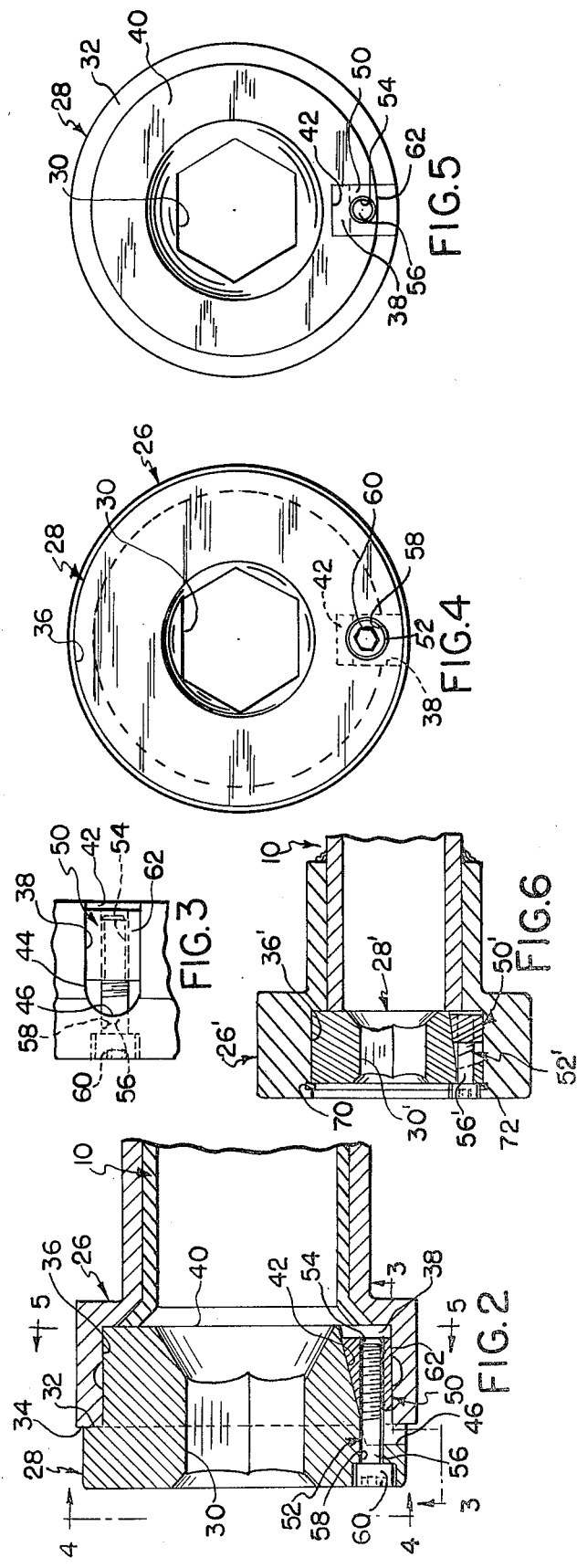

WORK HOLDER MECHANISM FOR AUTOMATIC MACHINE TOOL

This invention relates to automatic machine tools, such as for instance an automatic screw machine, and more particularly to a work holder for the machine tool.

BACKGROUND OF THE INVENTION

Removable work holders for use with automatic machine tools including a stock aligning bushing and means for locking the bushing to the feed or pusher tube are known in the art. One such arrangement embodies a circular track in the exterior surface of a stock aligning collar member of the work holder, which receives a ball therein and which includes an opposing circular track in the feed or pusher tube assembly and a set screw is provided which is adapted for urging the ball into gripping coaction with the tracks for locking the collar in selected position and in alignment with the feeding jaws of the feed tube. After a short period of time, such a set screw arrangement becomes worn and may not effectively lock the collar in selected position.

Another such arrangement for locking a work holder bushing to a feed tube is illustrated for instance in U.S. Pat. No. 1,885,224 which utilizes a collar 29 which has a noncircular bore or opening 30 therethrough for disposal in the flared bore 32 of a nut 33 threaded onto the rear inlet end of the pusher or feed tube 26. A threaded exterior sleeve 35 forces the collar 29 into wedging coaction with the flared bore 32 of a nut 33 to lock the collar 29 in a selected rotary adjusted position, thus providing for aligning the noncircular bore 30 in the collar with the jaws 11 of the chuck and the feed jaws 27 of the feed tube. The latter arrangement is unduly complex and relatively expensive to produce, resulting in increased costs and number of parts all of which tend to wear relatively rapidly and fail in extended use.

SUMMARY OF THE PRESENT INVENTION

The present invention provides a novel work holder mechanism which is quite rugged, which utilizes a wedge block means for locking the work holder bushing or collar in the inlet housing end of the pusher or feed tube, and wherein the collar member can be rapidly put in place and oriented in the feed tube housing, and can be rapidly removed therefrom.

Accordingly, an object of the invention is to provide a novel arrangement for locking a stock aligning member in selected position in a feed tube of a work holder assembly.

A still further object of the invention is to provide a novel stock aligning member having wedge block means for locking it in selected position in the conventional housing at the inlet end of a feed tube of the work holder assembly.

A still further object of the invention is to provide a work holder assembly of the aforedescribed type wherein the stock aligning collar includes a slot therein receiving the wedge block in surface-to-surface relation for camming the wedge block outwardly of the collar upon predetermined actuation of the actuating and deactuating means for the wedge block.

A still further object of the invention is to provide a stock feed tube and collet assembly for positioning in the spindle of an automatic screw machine and wherein a novel stock aligning and support member is provided on the inlet end of the feed tube, with the stock aligning member including wedge block means for locking the stock aligning member in selected rotary position with respect to the feed jaws of the feed tube, so that the noncircular opening through the stock aligning member is aligned with the noncircular opening defined by the feed jaws, and in a manner wherein relatively rapid disassembly of the stock aligning member from the feed tube and collet assembly can be accomplished.

Other objects and advantages of the invention will be apparent from the following description taken in conjunction with the accompanying drawings wherein:

BRIEF DESCRIPTION OF THE DRAWINGS

FIG. 1 is an elevational, sectional view of a pusher tube and collet assembly for an automatic machine tool, such as an automatic screw machine, wherein the stock aligning member at the inlet end of the feed tube has a novel wedge block means for locking it in selected rotated position in the conventional inlet end housing of the feed tube.

FIG. 2 is an enlarged, sectional view of the inlet end housing of the mechanism of FIG. 1, and illustrating in greater detail the wedge block means for locking the stock aligning collar member in selected position.

FIG. 3 is a view taken generally along the plane of line 3—3 of FIG. 2 looking in the direction of the arrows.

FIG. 4 is an end view of the assembly of FIG. 2 taken generally along the plane of line 4—4 of FIG. 2 looking in the direction of the arrows.

FIG. 5 is an end view of the stock aligning member and associated wedge block means taken generally along the plane of line 5—5 of FIG. 2 looking in the direction of the arrows; the portion of the inlet housing has been deleted from this view.

FIG. 6 is a sectional view generally similar to that of FIG. 2, but showing a modified form of the stock aligning member as mounted in the inlet end of the feed tube.

DESCRIPTION OF PREFERRED EMBODIMENTS

Referring now again to the drawings, there is shown a pusher or feed tube and collet assembly 5 positionable in the spindle of an automatic screw machine, for feeding stock through the machine. The feed tube and collet assembly includes an elongated feed tube 10 having a longitudinally open ended bore 11. One end of the feed tube is provided with a head portion 10a defining feed jaws 12 at its leading or right hand end which in turn define a noncircular (in transverse cross section) opening for gripping associated noncircular stock such as for instance hexagonal stock material W (FIG. 1) which is adapted to be fed through the coacting feed tube and collet assembly. The head portion 10a of the feed tube may be screw threaded onto the body portion 10b of the feed tube, as at 14, and a resilient ring-like member 16 may be provided coacting therebetween in a known manner for providing for slight circumferential adjustment of the jaws 12.

Elongated collet tube 18 is provided, with the feed tube telescoped into the collet tube for longitudinal and circumferential sliding movement therein. The collet 18 has an open ended bore 16' of predetermined noncircular (e.g. hexagonal) configuration in transverse section. The jaws 17 of the collet can likewise be part of a head portion which may be secured as by means of threads 20 to the body portion of the remainder of the collet tube in the conventional well-known manner.

A resilient key member 22 may be provided on one of the tube members adapted for being received in a longitudinal key slot 24 in the other member to align and releasably lock the feed tube and collet together circumferentially thereof in a manner disclosed for instance in U.S. Pat. No. 3,910,476 dated Oct. 7, 1975, to Chester S. Zajac. Accordingly, it will be seen that while the feed and collet tubes are locked circumferentially with respect to one another when the resilient key is in disposed in the slot 24, the feed tube 10 can move lengthwise or longitudinally of the collet.

The inlet end of the feed tube 10 is conventionally provided with a housing section 26 which in the embodiment illustrated is formed as a separate part and then is secured as by welds to the feed tube proper, and which receives therein a stock aligning and support collar member 28. Axial opening 30 through member 28 is of noncircular configuration in the embodiment illustrated, such as for instance, hexagonal in transverse cross section. Collar or bushing member 28 is generally circular or cylindrical in its exterior configuration, as can be seen for instance from FIGS. 2 and 4, and may include circumferential shoulder 32 which is adapted to coact with the confronting surface 34 of the cylindrical housing section 26 in generally abutting relation, when the collar 28 is inserted into the cylindrical opening 36 defined by housing section 26.

Collar member 28 is provided with a longitudinal slot 38 therein commencing at the inner face 40 thereof and tapering in a laterally outward direction, to provide generally flat tapered cam surface 42 for a purpose to be hereinafter set forth.

Mounted in the slot 38 is a wedge block member 50, adapted for longitudinal movement relative to the collar member upon actuation of the actuating means 52, for locking the collar member in predetermined rotated condition in the opening 36 of housing section 26. Block 50 has a threaded opening 54 therethrough which coacts with the threaded fastener or bolt 56 comprising the aforementioned actuating means 52, so that upon rotation of the bolt 56 in predetermined direction, wedge block 50 is moved or drawn longitudinally inwardly relative to the collar member into wedging locking relation with the confronting surface of opening 36. Once block 50 is in wedging locking condition, in order to release it, the bolt 56 may be rotated in the opposite direction which backs the bolt partially out of the block and then the bolt can be tapped with a tool to force the block 50 out of wedged condition in slot 38.

As can be seen, bolt 56 extends through an opening 58 which communicates from the exterior of the collar member 28 to the rounded end 46 of slot 38. Bolt 56 is in the embodiment illustrated of the socket type with the rounded head 60 of the bolt being received in a complementary enlarged section of opening 58 for rotation therein. The exterior or outer side 62 of the wedge block is preferably arcuate in transverse section as can be best seen in FIG. 5, for surface-to-surface coaction with the confronting arcuate interior surface of the opening 36 in housing section 26.

In operation, the operator selects a collar member 28 having the proper size opening 30 therethrough, for aligning and supporting the workpiece or stock bar W (FIG. 1) which is adapted to be fed longitudinally through the feed or pusher tube and collet assembly, so that successive portions thereof may be operated on by a tool of the machine. The longitudinal feeding of the stock is effected by the feed tube with the feeding jaws 12 thereof frictionally engaging the stock and moving the latter through the jaws of the collet after the stock has been released by the collet. The feed or pusher tube is guided in its longitudinal movement preferably by the coacting slot and resilient key arrangement 24, 22 aforediscussed.

With the adjustable arrangement provided by the wedge block member 50 and associated actuating means 52, alignment of the noncircular stock or workpiece with the feeding jaws and the jaws of the collet is effected at the intake end of the feed tube, after which the actuating means 52 is actuated to lock the stock aligning collar 28 in position, with the opening 30 thereof in alignment with the opening defined by feed tube jaws 12 and collet jaws 17. It will be seen that with the wedge block arrangement illustrated, considerable wedging area is provided resulting in a highly rigid wedge lock between the adjustable collar 28 and the pusher or feed tube housing section 26. Moreover, by providing the curved inner end 46 for the slot 38 in the collar member, the inward movement of the wedge block 50 relative to the collar is limited, since interference between the sides of the wedge block and the sides of the slot in the collar member will occur upon attempting to move the wedge block longitudinally inwardly beyond approximately point or transverse plane 44 in the slot. However, with curved end 46, there is still provided sufficient allowance for movement of wedge 50 to compensate for wear, and/or manufacturing tolerances of the parts.

Referring now to FIG. 6, there is shown another embodiment of the invention wherein the collar member 28' is received within the opening 36' of the housing section 26' of the pusher tube 10. In this embodiment a split, resilient retainer ring 70 is received in a circumferential slot 72 formed in the interior surface of opening 36' in the housing section 26', for retaining the aligning and support collar 28' in the opening, irrespective of deactuation of the wedge block 50'. Collar 28' is readily rotatable with respect to the retainer ring 70, upon deactuation of the bolt 56' of the actuating means 52'. It will be seen that in this embodiment the actual length of the wedge block member 50' is considerably shorter than the length of the wedge block member 50 in the first described embodiment. Likewise, the axial length of collar member 28' is shorter than the axial length of collar member 28 in the first described embodiment. In other respects, this second embodiment is generally similar to the first described embodiment, and provides for rapid adjustment and locking of the collar member 28'. In this embodiment, the split retainer ring 70 has to be removed of course prior to removal of the collar member 28' from the opening of housing section 26'.

While the stock receiving opening 30 or 30' through the aligning and/or supporting collar has been illustrated as being noncircular for aligning noncircular stock with a noncircular opening defined by the feed tube jaws, the collar opening could be circular for a work holder arrangement utilizing circular stock.

From the foregoing discussion and accompanying drawings, it will be seen that the invention provides a novel work holder assembly including a stock supporting and/or aligning bushing member, and in a manner wherein the bushing or collar member embodies wedge means for effectively locking the collar or bushing member in position. The locking arrangement is simple and rugged in construction, and provides for rapid assembly and disassembly of the collar member in the inlet end of the pusher or feed tube.

The terms and expressions which have been used are used as terms of description and not of limitation, and there is no intention in the use of such terms and expressions of excluding any equivalents of any of the features shown or described, or portions thereof, and it is recognized that various modifications are possible within the scope of the invention claimed.

What is claimed is:

1. A work holder for an automatic tool machine, comprising, a chuck carrying tube, a stock feed tube arranged within the chuck carrying tube and having feeding jaws including faces defining a predetermined non-circular passage configuration in transverse section, and an adjustable, non-gripping stock aligning device at the intake end of said feed tube for aligning non-circular in cross section, stock with said faces of said feeding jaws, said aligning device comprising an axially apertured collar at least a portion of which is of generally cylindrical exterior configuration rotatable with respect to said feed tube, the aperture through said collar being non-circular in transverse section, generally complementary to said non-circular passage configuration, said intake end having an opening formed therein generally complementary to the exterior of said collar and receiving said cylindrical portion interiorly thereof in rotatable relation, and including wedge means mounted on said collar, said collar having a slot in the exterior of said cylindrical portion extending generally parallel to the lengthwise axis of said aperture through said collar, said wedge means comprising a wedge block movable generally axially in said slot relative to said collar and adapted for abutting holding coaction with the defining surface of said intake end opening and with said collar, for locking the aligning device in selected rotated position wherein the defining surfaces of the aperture through said collar will be aligned with said faces of said feedings jaws, and means coacting between said wedge means and said collar for selectively actuating and deactuating said wedge means.

2. A work holder for an automatic tool machine comprising, a chuck carrying tube, a stock feed tube arranged within the chuck carrying tube and having feedings jaws including faces defining a predetermined non-circular passage configuration in transverse section, and an adjustable, non-gripping stock aligning device at the intake end of said feed tube for aligning non-circular in cross section stock with said faces of said feeding jaws, said aligning device comprising an axially apertured collar rotatable with respect to said feed tube, the aperture through said collar being non-circular in transverse section, generally complementary to said non-circular passage configuration, said intake end having an opening formed therein generally complementary to the exterior of said collar and receiving said collar interiorly thereof in rotatable relation, and including wedge means mounted on said collar, said wedge means being movable relative to said collar and adapted for abutting holding coaction with the defining surface of said intake end opening and with said collar for locking the aligning device in selected rotated position wherein the defining surfaces of the aperture through said collar will be aligned with said faces of said feeding jaws, and means coacting between said wedge means and said collar for selectively actuating and deactuating said wedge means and wherein the portion of said rotatable collar received in said intake end of said feed tube is generally cylindrical in exterior configuration and, said wedge means comprises a wedge block movable relative to said collar in a direction generally parallel to the lengthwise axis of said aperture through said collar, said collar having a slot therein in the exterior thereof, said collar slot movably receiving said block therein, said collar slot and block having complementary confronting wedge surfaces adapted for sliding wedging coaction upon predetermined actuation of said actuating means for moving said wedge block relative to said wedge surface in said collar slot, and thereby causing locking of said collar to hold said collar in predetermined rotational orientation with respect to said passage configuration defined by said feeding jaws.

3. A work holder in accordance with claim 2 wherein said collar comprises a circumferential shoulder thereon oriented exteriorly of said intake end opening and adapted for abutting coaction with a complementary shoulder on said feed tube at said intake end for limiting movement of said collar lengthwise of said feed tube in one direction, said actuating and deactuating means comprising a threaded fastener extending through a non-threaded aperture in said collar and into a threaded aperture in said wedge block so that upon rotation of said fastener in a predetermined direction the wedge block is moved relative to said collar in a direction to cause wedge locking of said block between said collar and the interior surface of said intake end opening of said feed tube.

4. A work holder in accordance with claim 2 wherein said feed tube at its intake end comprises a belled portion defining said opening receiving therein said collar and said wedge block.

5. A work holder in accordance with claim 4 wherein the outer surface of said wedge block facing said belled portion is of arcuate configuration in transverse section, while the opposing inner surface of said wedge block is of generally linear configuration in transverse section, said wedge block having an opening therein and threads in said opening comprising said actuating and deactuating means and adapted to coact with a threaded fastener of said actuating and deactuating means for moving said wedge block in a direction responsive to predetermined direction of rotation of said fastener, the latter being mounted on said collar for rotary movement relative thereto.

6. A work holder in accordance with claim 2 wherein said feed tube at said intake end includes an enlarged housing section defining said opening receiving therein said collar, said wedge block coacting with the inner circular surface of said housing section for wedge locking the collar to said housing section, and thus to said feed tube, and retainer means coacting between said collar and said housing section for retaining the collar in the housing upon loosening of said wedge block by predetermined actuation of said actuating and deactuating means.

7. A work holder in accordance with claim 6 wherein said retainer means comprises a resilient split ring received in a circumferential groove in said housing section outwardly of said collar, for preventing axial movement of said collar in a direction out of said housing section, said retainer means being selectively removable from said housing section thereby providing for removal of said collar therefrom.

8. A work holder in accordance with claim 2 wherein said slot has an arcuate end configuration for causing interference between said wedge block and the defining surfaces of said slot after predetermined movement of said wedge block inwardly of said collar by actuation of said actuating and deactuating means.

9. A rotatable collar for use in a work holder including a feed tube for an automatic tool machine, such as for instance, an automatic screw machine, at least a portion of said collar being of cylindrical exterior configuration and having an axial aperture therethrough adapted to receive bar stock therethrough, said collar being adapted for rotatable mounting in the inlet end opening of the feed tube and having a slot therein in the exterior surface of said cylindrical portion, said slot extending in said exterior surface in a lengthwise direction generally parallel to the lengthwise axis of said axial aperture in said collar, said slot commencing at one lengthwise end of said collar and terminating inwardly of the other lengthwise end thereof, the inwardly terminating end of said slot being arcuate in plan, and a wedge block received in said slot for movement lengthwise thereof, said slot and wedge block having complementary oblique, with respect to said lengthwise axis of said axial aperture, cam surfaces for causing wedging coaction between said block and the defining interior surface of the inlet end opening of the feed tube, upon predetermined actuating movemeng lengthwise of said slot so as to lock said collar in selected rotated position in the feed tube by abutting holding coaction between said collar and the confronting surface of the feed tube, and means coupled to said wedge block and coacting between said wedge block and said collar for selectively actuating and deactuating said wedge block.

10. A collar in accordance with claim 9 including an opening through said collar from said other lengthwise end thereof and communicating with said one terminating end of said slot, the last mentioned opening receiving therethrough in relative rotatable relation said actuating means in said coupled relation to said wedge block, said terminating end of said slot limiting inward movement of said wedge block relative to said collar.

11. A rotatable collar for use in a work holder including a feed tube for an automatic tool machine, such as for instance, an automatic screw machine, said collar having an axial aperture therethrough adapted to receive bar stock therethrough, said collar being adapted for rotatable mounting in the inlet end opening of the feed tube and having a slot therein in the exterior surface thereof, said slot extending in said exterior surface in a lengthwise direction generally parallel to the lengthwise axis of said axial aperture in said collar, said slot commencing at one lengthwise end of said collar and terminating inwardly of the other lengthwise end thereof, the inwardly terminating end of said slot being arcuate in plan, and a wedge block received in said slot for movement lengthwise thereof, said collar slot and wedge block having complementary oblique, with respect to said lengthwise axis of said aperture, cam surfaces for causing wedging coaction between said block and the defining interior surface of the inlet end opening of the feed tube upon predetermined actuating movement of said block lengthwise of said slot, being adapted for locking so as to lock said collar in the feed tube by abutting holding coaction between said collar and the confronting surface of the feed tube, and means coacting between said wedge block and said collar for selectively actuating and deactuating said wedge block, and wherein said actuating and deactuating means comprises a threaded fastener rotatably mounted on said collar and extending into threaded coaction with a threaded opening in said wedge block, wedging coaction occuring between said block and the feed tube upon predetermined rotation of said fastener resulting in said actuating movement of said wedge block relative to said collar and in a direction toward said terminating end of said slot.

12. A rotatable collar for use in a work holder including a feed tube for an automatic tool machine, such as for instance, an automatic screw machine, at least a portion of said collar being of cylindrical exterior configuration and having an axial aperture therethrough adapted to receive bar stock therethrough, said collar being adapted for rotatable mounting in the inlet end opening of the feed tube and having a slot therein in the exterior surface of said cylindrical portion, said slot extending in said exterior surface in a direction generally parallel to the lengthwise axis of said axial aperture in said collar, said slot commencing at one lengthwise end of said collar and terminating inwardly of the other lengthwise end thereof, the inwardly terminating end of said slot being arcuate in plan, and a wedge block received in said slot for movement lengthwise thereof, said wedge block upon predetermined actuating movement lengthwise of said slot being adapted for locking said collar in selected rotated position in the feed tube by abutting holding coaction between said collar and the confronting surface of the feed tube, means coacting between said wedge block and said collar for selectively actuating and deactuating said wedge block, and wherein said actuating and deactuating means comprises a threaded fastener rotatably mounted on said collar and extending into threaded coaction with a threaded opening in said wedge block, said collar slot and wedge block having complementary oblique wedge surfaces for causing wedging coaction between said block and the defining complementary interior surface of the inlet end opening of the feed tube upon predetermined rotation of said fastener resulting in said actuating movement of said wedge block relative to said collar, the outer surface of said wedge block which is adapted for confronting relation to the defining complementary interior surface of the feed tube inlet end opening being of arcuate configuration in transverse section while the opposing inner wedge surface of the wedge block being of generally linear configuration in transverse section, and said threaded opening in said wedge block extending lengthwise of said wedge block generally parallel to the axis of the lengthwise aperture through said collar.

13. A collar in accordance with claim 12 wherein said axial collar aperture is of noncircular configuration for receiving and aligning noncircular bar stock therethrough.

14. A collar in accordance with claim 12 including laterally projecting shoulder means on said collar at said other lengthwise end thereof, adapted for abutting coaction with a complementary shoulder on the inlet end of the feed tube for limiting movement of the collar lengthwise of the feed tube in one direction.

* * * * *